US006940784B1

(12) United States Patent
Benson

(10) Patent No.: US 6,940,784 B1
(45) Date of Patent: Sep. 6, 2005

(54) HAND HELD LAP INDICATOR FOR SWIMMERS

(76) Inventor: Lynn S. Benson, 5863 Sugartree Dr. NE., Rockford, MI (US) 49341

( * ) Notice: Subject to any disclaimer, the term of this patent is extended or adjusted under 35 U.S.C. 154(b) by 347 days.

(21) Appl. No.: 10/269,629

(22) Filed: Oct. 11, 2002

Related U.S. Application Data

(60) Provisional application No. 60/348,178, filed on Oct. 23, 2001.

(51) Int. Cl.[7] ......................... G04B 47/00; G01C 22/00
(52) U.S. Cl. ............................ 368/10; 368/110; 377/5; 377/24.2
(58) Field of Search .................. 368/110–113; 377/20, 377/5, 24.2; 482/3, 55; 369/10

(56) References Cited

U.S. PATENT DOCUMENTS

| | | | | |
|---|---|---|---|---|
| 4,237,372 A | * | 12/1980 | Zevgolis et al. | 377/5 |
| 4,518,266 A | * | 5/1985 | Dawley | 368/10 |
| 4,700,369 A | * | 10/1987 | Siegal et al. | 377/24.2 |
| 4,932,045 A | * | 6/1990 | Kasoff et al. | 377/24.2 |
| 4,993,004 A | * | 2/1991 | Loizeaux | 368/107 |
| 5,125,010 A | | 6/1992 | Lee et al. | 377/24.2 |
| 5,130,955 A | | 7/1992 | Luerker et al. | 368/3 |
| 5,136,621 A | | 8/1992 | Mitchell et al. | 377/24.2 |
| 5,285,428 A | | 2/1994 | Rosow et al. | 368/107 |
| 5,349,569 A | | 9/1994 | Tanaka | 368/10 |
| 6,046,686 A | * | 4/2000 | Mitchell et al. | 340/936 |
| 6,156,987 A | | 12/2000 | Warne | 200/512 |

* cited by examiner

*Primary Examiner*—Vit W. Miska
(74) *Attorney, Agent, or Firm*—Van Dyke, Gardner, Linn & Burkhart, LLP

(57) ABSTRACT

A hand held lap indicator for indicating a lap number to a swimmer in a pool includes a casing having a front surface, a rear surface and a handle portion. The front surface provides a lap indicating display operable to display a lap indicating number to the swimmer. The handle portion includes at least one button which is actuatable to at least advance the lap indicating number in response to a manual input by the user or holder of the lap indicator. The lap indicator may include a timing device and may be operable to display a timing output to the swimmer. The rear surface of the casing preferably includes a last lap indicating panel, such that when the user flips the lap indicator around, the last lap indicating panel indicates to the swimmer that the swimmer is on the final lap.

24 Claims, 3 Drawing Sheets

HAND HELD LAP INDICATOR FOR SWIMMERS

CROSS REFERENCE TO RELATED APPLICATION

The present application claims priority of U.S. provisional application Ser. No. 60/348,178, filed Oct. 23, 2001 by Benson for HAND HELD LAP INDICATOR FOR SWIMMERS, which is hereby incorporated herein by reference in its entirety.

FIELD OF THE INVENTION

The present invention relates generally to a lap counter and indicator for tracking the number of laps that a swimmer completes during a swimming race and, more particularly, to a lap counter and indicator which is submersible to indicate to the swimmers in the water how many laps they have completed.

BACKGROUND OF THE INVENTION

Typically, lap or length counters for use during swimming races are plastic devices which have number cards to indicate the number of laps or lengths the swimmers have completed. The numbers are on hinged cards or plates, such that the cards or plates are flipped to show the next number each time the swimmer completes a lap. The cards, and the base they are mounted to, are plastic so that the entire indicator can be submersed into the water to show the swimmer how many laps they have completed, whereby the swimmer does not have to raise his or her head above the water to see the lap indicator. However, the plastic cards often break from their plastic hinges, and thus are often in need of maintenance or replacement. Also, the plastic cards require manual flipping of the cards to show the next number, and are typically confusing to use.

Other lap indicators have been proposed which provide a digital readout to indicate the number of laps completed by the swimmer. However, such an indicator device is typically clamped to the wall of the swimming pool with the digital readout positioned at an upper portion of the device, such that the digital readout is not submersed under the water for viewing by the swimmer underwater. The device includes a touchpad which is positioned at a lower portion of the device so as to be submersed beneath the water when the device is clamped to the wall. The swimmer may then touch the touchpad at the wall to advance the lap count. Such a device typically has a small readout, since the readout is for viewing by a person holding the indicator or for viewing by a swimmer above the water and not for underwater viewing by the swimmer during the race. Also, such devices may be expensive due to the touch pad circuitry.

SUMMARY OF THE INVENTION

The present invention is intended to provide an electronic lap or length counter and indicator which provides a digital display of the laps or lengths completed by a swimmer and which is completely submersible into the water at the pool for viewing by the swimmer.

According to an aspect of the present invention, a lap indicator or indicating device comprises a large viewing or display screen which includes a digital display for displaying large numbers which may be viewed from a distance. The digital display may comprise a liquid crystal display (LCD) or may comprise other illuminated type displays, such as a light emitting diode (LED) displays, or the like. The indicator is operable to indicate to a swimmer the number of laps or lengths completed by the swimmer in a pool, such as during a swimming race. The digital display is adjusted by a manual input by a person holding the indicator to increment the display number as each lap is completed by the swimmer. The indicator is a watertight device and is completely submersible into the water for viewing by the swimmer in the pool. The size of the display is selected to be a sufficient size for viewing from a distance under water. The indicator may include a bright color display, such as bright orange or the like, on a reverse side for indicating to the swimmer in the pool that the swimmer is on the final lap of the race. The indicating device of the present invention also includes a handle at an upper portion of the device, such that a person using the device may grasp the handle and submerse the indicating device into the water for viewing by a swimmer in the pool.

Preferably, the indicating device of the present invention includes an advance button or switch and a decrease button or switch for manually advancing or incrementing the display number and for decreasing the display number. The decrease button allows a user to correct a user error in situations where the user may accidentally advance the numerical display more than one number. Optionally, the indicating device may further include a stopwatch function for tracking the elapsed time during the race.

The indicating device is preferably a relatively thin, generally rectangular shaped device and may be stored upright in a container, such that multiple indicators may be easily and efficiently stored in a single container to ease transport and storage of the indicating devices. The container preferably includes a plurality of spacers or separator tabs to keep the indicating devices separated or spaced from one another when placed in the container to avoid damage to the indicating devices.

According to another aspect of the present invention, a hand held indicating device for indicating a lap count to a swimmer in the water of a swimming pool includes a casing, a digital display at a front panel of the casing, and at least one input device at a handle portion of the casing. The handle portion is configured for a user to hold the indicating device and to at least partially submerse the indicating device into the water. The digital display is operable to display a lap indicating number to the swimmer. The input device is operable at least to advance the lap indicating number of the digital display in response to an input to the input device by the user or holder of the indicating device.

Preferably, the input device includes a first button for advancing the lap indicating number, a second button for reducing the lap indicating number and a third button for resetting the lap indicating number. Preferably, the digital display comprises at least three digits or numerals.

In one form, the hand held indicating device includes a timing device or timing circuitry and is operable to display a timing output from the timing device via the lap indicating display. Preferably, the input device includes a button or switch or control which is operable to switch the display between a lap indicating mode and a timing indicating mode. Optionally, the hand held indicating device is automatically operable to switch the display between a lap indicating mode and a timing indicating mode. Optionally, the indicating device is operable to display a timing output via a separate timing display at the front surface of the casing.

Preferably, the casing of the hand held indicating device has a highly visible panel on a rear surface thereof which provides a last lap indicator for indicating to the swimmer that the swimmer is on the last lap when the indicating device is reversed or flipped over by the user.

According to another aspect of the present invention, a hand held indicating device for indicating a lap count to a swimmer in the water of a swimming pool includes a casing, a digital display at a front panel of the casing, at least one input device at a handle portion of the casing, and a last lap indicating display at a rear panel of the casing. The handle portion is configured for a user to hold the indicating device and to at least partially submerse the indicating device into the water. The digital display comprises at least a two digit digital display and is operable to display a lap indicating number to the swimmer. The input device is operable at least to advance the lap indicating number of the digital display in response to an input to the input device. The last lap indicating display comprises a highly visible display panel for indicating to the swimmer that the swimmer is on the final lap when the holding position of the casing is reversed.

According to yet another aspect of the present invention, a method for indicating a lap count to a swimmer in the water of a swimming pool includes providing a hand held indicating device which includes a casing having a front surface, a rear surface and a handle portion. The front surface includes a lap count display operable to display a lap indicating number to the swimmer. The handle portion is held by a user outside of the water at an end of the pool and the user at least partially submerses the lap count display in the water. The lap indicating number is displayed to the swimmer as the swimmer approaches the end of the pool. The lap indicating number is advanced by the user actuating a button on the handle portion of the hand held indicating device.

Preferably, the method includes displaying a last lap indicator to the swimmer by turning the casing around to display a rear surface to the swimmer, wherein the rear surface includes a highly visible display panel.

Therefore, the present invention provides a lap counting and indicating device which is easily operated or incremented by a user or holder and is easily viewable by a swimmer in the pool. The indicating device of the present invention is manually operated by a user holding the indicating device at least partially underwater, and thus provides a low cost, easy to set up and easy to use indicating device. The present invention further provides for a storage and transportation container for the lap counting and indicating device.

These and other objects, advantages, purposes, and features of the present invention will become apparent upon review of the following specification in conjunction with the drawings.

DESCRIPTION OF THE PREFERRED EMBODIMENTS

Figure 1:
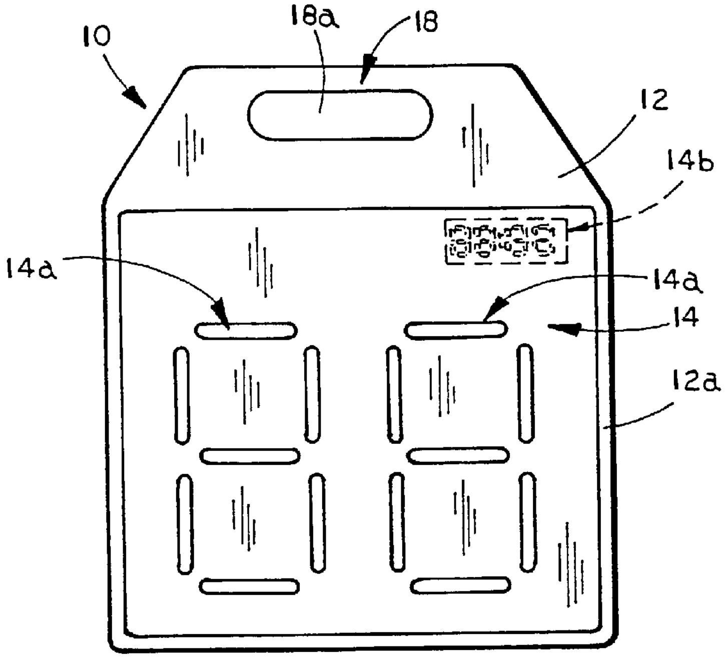
FIG. 1 is a front elevation of a lap indicating device in accordance with the present invention.

Referring now to the drawings and the illustrative embodiments depicted therein, a lap counter and indicator or lap indicating device 10 comprises a watertight housing or casing 12 and a display 14 on a forward face or surface 12*a* for displaying a numerical display to a swimmer in the water which is indicative of the number of laps completed by the swimmer. Display 14 is a large display, such as approximately twelve to fourteen inches square and includes large digital numerals or digits 14*a*, such that the numbers are easily viewed from a distance by a person in the water. The numbers 14*a* of display 14 may be advanced by a user or holder of the indicating device 10 via depressing or otherwise actuating an appropriate user input or manual input 22, such as one or more buttons or the like, at a handle portion 18 of the indicating device 10. An opposite rearward face or surface 12*b* of casing 12 preferably provides a bright or otherwise highly visible signal 20 (such as a bright orange surface or the like) to indicate to the swimmer in the water that he or she is on the final lap. The indicating device 10 is a hand held device and may be held at least partially below the surface of the water at an end of a pool or the like by a person outside of the pool, such as a trainer or coach. The lap indicating number may be advanced by the person holding the indicating device and the indicating device may be flipped over or turned around to provide the last lap indication to the swimmer when the swimmer is on the final lap, as discussed below.

Casing 12 is watertight and waterproof, in order to withstand submersion of the entire casing into the water, such that the swimmer can view the display without lifting their head out of the water. Casing 12 thus provides a watertight housing for the electronic components and circuitry of the indicating device 10. Preferably, casing 12 includes watertight seals around the buttons and displays and seams of the casing, to prevent water from entering the internal portions of casing 12. Because indicating device 10 is an electronic device and, thus, would require batteries for powering the portable device, casing 12 may further include a removable battery cover 16, which also includes seals and the like to prevent water entry through any seams of the battery cover.

Figure 3:
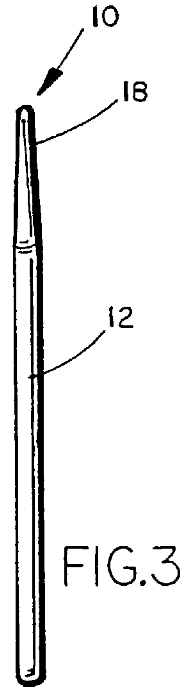
FIG. 3 is a side elevation of the lap indicating device of FIGS. 1 and 2.

As shown in FIG. 3, casing 12 is preferably a thin housing, and is preferably only approximately 1½ inches thick or less. However, casing 12 may be other dimensions, depending on the desired application and size of the internal components, without affecting the scope of the present invention. Preferably, casing 12 is a generally square or rectangular shaped housing and includes a handle portion 18 at an upper end thereof. In the illustrated embodiment, handle portion 18 includes an opening 18*a* for a person's hand to insert through to grasp the casing 12 and easily carry indicating device 10 and at least partially submerse at least the display portion 14 of indicating device 10 into the water.

Display 14 is positioned on front surface 12*a* of casing 12 and is large enough for viewing from a distance and from under water. As shown in FIG. 1, display 14 preferably covers almost the entire surface of front portion 12*a* of casing 12 to provide a maximum viewing area of the display. In the illustrated embodiment, display 14 is approximately twelve inches tall by approximately fourteen inches wide, but could be other sizes, without affecting the scope of the present invention. Preferably, the lap indicating numbers 14*a* displayed on display 14 are also substantially large, so that they are easily viewed by a swimmer at a distance and in the water. In one embodiment, the numbers 14*a* may be at least approximately six inches high on display 14. However, other sized numbers may be provided without affecting the scope of the present invention.

Figure 4:
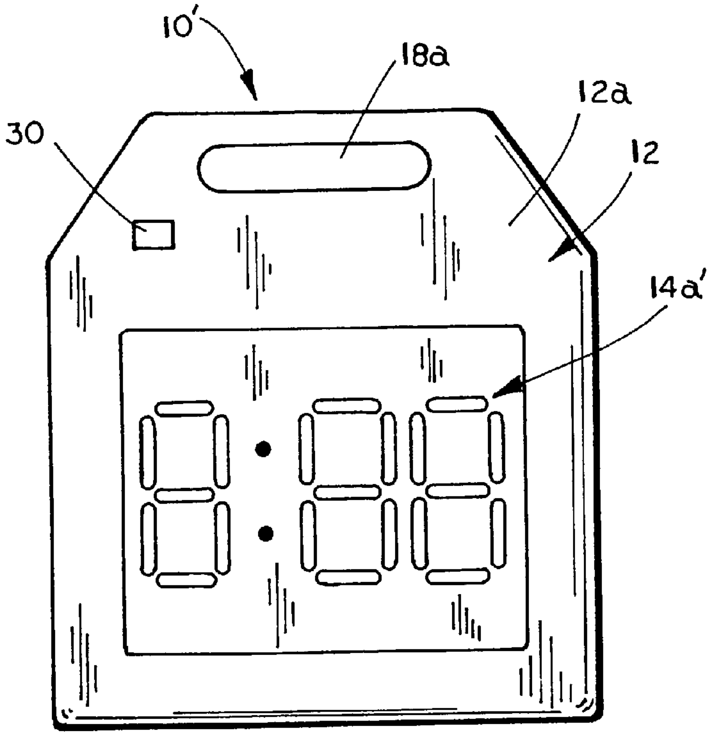
FIG. 4 is a front elevation of another embodiment of a lap indicating device in accordance with the present invention.

Preferably, display 14 provides for a digital display of at least two digits or numerals, and preferably three digits or numerals (as shown in FIG. 4). For example, the display may be a two digit display for displaying numbers between zero and ninety-nine, or a three digit display for displaying numbers between zero and nine hundred ninety-nine (with a three digit display, or even a four digit display, the digital display may also be suitable for displaying a timing function, as discussed below). The numerical display may be a liquid crystal display (LCD) or may be any other illumination type display, such as a plurality of light emitting diodes (LEDs) or the like, or any other electrically activated digital display, without affecting the scope of the present invention.

Figure 2:
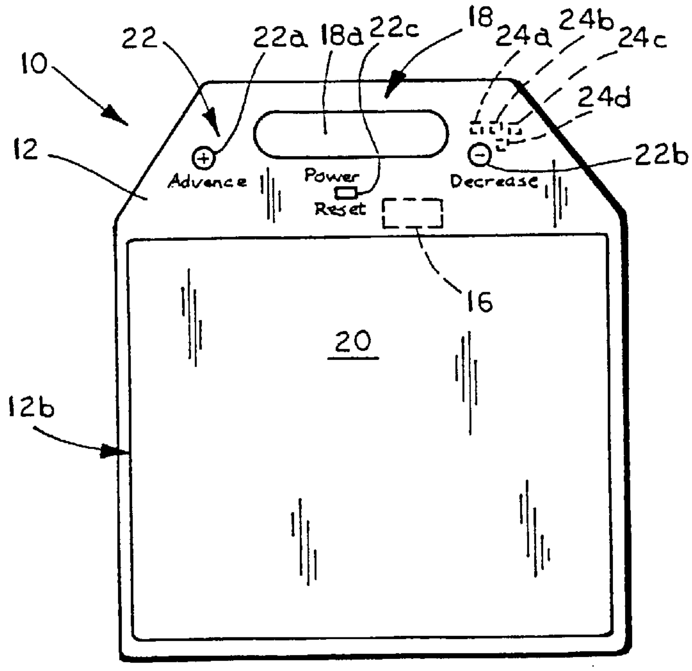
FIG. 2 is a rear elevation of the lap indicating device of FIG. 1.

As shown in FIG. 2, indicating device 10 further includes a last lap indicating display 20 on the rear surface 12*b* of casing 12. Last lap indicating display 20 preferably comprises a bright colored, highly visible plate or display panel, such as a bright orange display panel or the like. The last lap indicator 20 provides an indication to the swimmer that they are on the last lap of the race and is easily displayed to the swimmer by the user or holder of indicating device 10 flipping indicating device 10 over, such that the rear surface 12*b* is positioned in the water facing toward the swimmer approaching the wall. Similar to digital display 14, the last lap indicating display 20 is a large display and covers most of the area of the rear surface 12*b* of casing 12, in order to maximize visibility of the display to a person in the water.

Indicating device 10 further includes a manual or user input device 22 for manually advancing, decreasing and resetting the number being displayed on display 14. Display 14 is preferably associated with or connected to a counting circuitry 26 (FIG. 5) or the like, which is operable to increment or advance the number being displayed by the digital display in response to a user input to the input device 22. In the illustrated embodiment, the user input device or manual counter input 22 comprises a plurality of buttons at the handle portion 18 of the casing 12. For example, and preferably, as shown in FIG. 2, an advance button 22*a* may be positioned at rear surface 12*b* of casing 12, such as at or near the handle portion 18, and may be easily depressed or actuated by a user's thumb or finger while the user is holding indicating device 10 by handle portion 18. A decrease button 22*b* and a reset (and/or power) button 22*c* may also be positioned on the rear surface 12*b* of indicating device 10, and preferably are separated from advance button 22*a*, in order to substantially reduce the possibility that a user of indicating device 10 may accidentally depress the decrease button 22*b* or reset button 22*c* when attempting to press the advance button 22*a*. The counting circuitry 26 is operable to adjust the digital display output (increment, decrease or reset) in response to actuation or depression of one or more of the buttons 22*a*, 22*b*, 22*c*.

Optionally, indicating device 10 may further include a timing device or timing circuitry 28 (FIG. 5) operable to provide a stopwatch function. The stopwatch may include a manual timer input 24, such as a start button 24*a*, stop button 24*b*, lap time button 24*c*, and/or reset button 24*d* (FIG. 2) and/or any other inputs or controls desired for controlling the stopwatch functions. Additionally, a time display 14*b* may be included on display 14, such as in an upper portion or corner of display 14 (as shown in phantom in FIG. 1), or on the reverse side 12*b* of the indicating device, to indicate the lap time or running time of the race being monitored by the user of the indicating device 10. As shown in FIG. 1, the time display 14*b* is preferably smaller than the lap counter display 14*a*, since the time information is not as important to the swimmer swimming the race and, thus, does not need to be as highly visible to the swimmer. In such an embodiment, the timing circuitry 28 may be separate from the lap indicating and/or counting circuitry 26.

Figure 5:
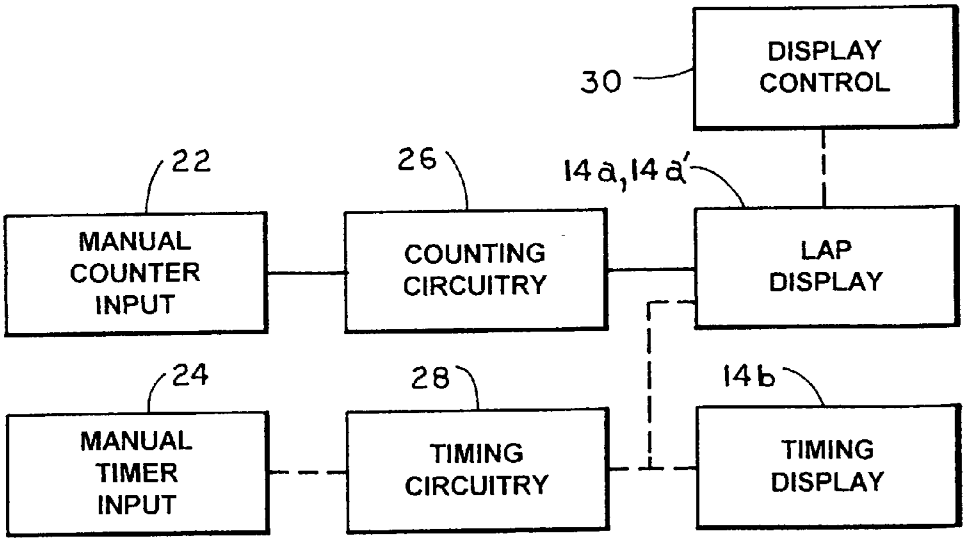
FIG. 5 is a block diagram of the circuitry and controls useful with a lap indicating device in accordance with the present invention.

Optionally, however, and as shown in FIGS. 4 and 5, a lap counter display 14*a*' of an indicating device 10' may be associated with and selectively controlled by the timing circuitry, such that the lap counter display 14*a*' may also be operable to display the lap time and/or running time of the swimmer's race or practice, if desired. In such a configuration, it is desirable that the digital display comprises a three digit or four digit display, in order to provide a display of the elapsed minutes and seconds to the swimmer. The indicating device may then include a manually actuatable selection button or switch or control or the like 30 so that the user or holder of the indicating device may select whether the display 14*a*' will operate in a lap indicating mode, whereby the display 14*a*' displays the lap count to the swimmer (whereby the lap count may be manually adjusted via buttons or controls at the handle portion, such as discussed above with respect to lap indicating device 10), or a time indicating mode, whereby the display 14*a*' displays the time function to the swimmer. It is further envisioned that the selection control 30 may be an automatic control, such that the time display mode and the lap count display mode may be automatically periodically alternated (such as approximately every three seconds or some other appropriate time period) in response to control 30 to alternatingly provide each of the displays to the swimmer, without affecting the scope of the present invention.

Figure 6:
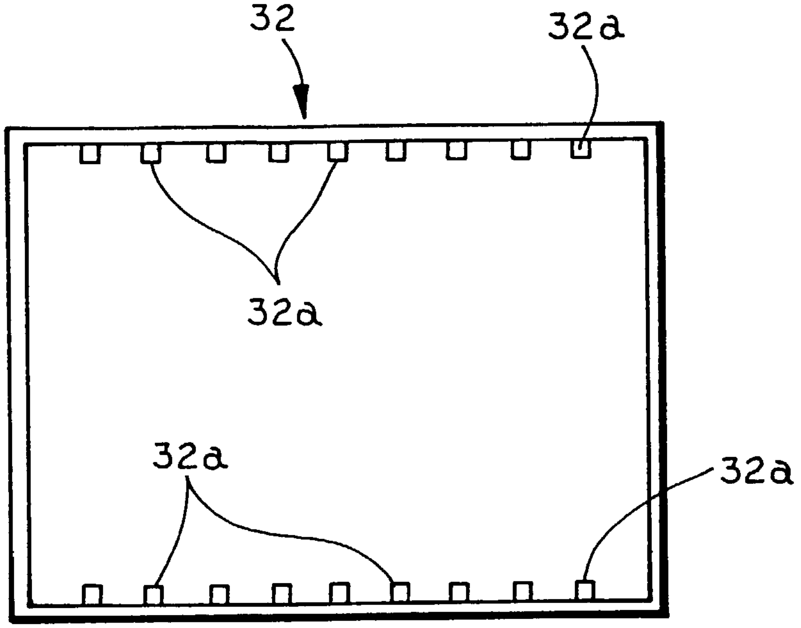
FIG. 6 is a top plan view of a carrier useful for carrying the lap indicating device of the present invention.
Figure 7:
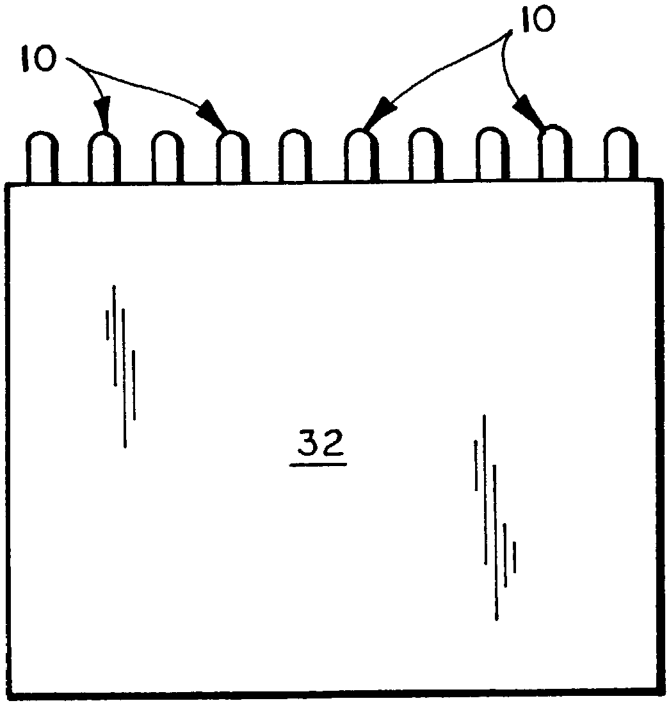
FIG. 7 is a side elevation of the carrier of FIG. 6, with a plurality of lap indicating devices being positioned therein.

Because the indicating device is a thin, generally rectangular or square shaped device, indicating device 10 may be easily stored in a vertical orientation within a box or container 32, such as shown in FIGS. 6 and 7. The container 32 may further include dividers or spacers or separating tabs 32*a* along each side for guiding and separating each indicating device in the container, such that a number of indicating devices may be easily stored and/or transported in the container 32 without contacting one another and potentially becoming damaged during transport.

Therefore, the present invention provides a lap counting and indicating device which provides a large digital display to a person in the water and which is completely submersible into the water for viewing by the person underwater. The digital display is large enough to be easily seen by a swimmer at a distance from the wall at which the indicating device is held or positioned. The digital display may display the lap count and/or a time (such as a running time or a lap time) to the swimmer. The indicating device includes a handle at an upper portion thereof and manual inputs or controls for adjusting the number being display by the digital display and/or for selecting whether the lap count or time will be displayed to the swimmer. The indicating device is thus easily portable via the handle and may be easily submersed into the water by a person standing or kneeling by the wall of the pool and holding the indicating device. The indicating device further includes a large bright panel on a surface of the indicating device opposite the digital display, such that the indicating device may be flipped or reversed to display the large bright panel to the swimmer in the water to indicate that the swimmer is on the final lap of the race. Optionally, the indicating device may include a separate stopwatch feature for timing the running time and lap time of the race being monitored.

Changes and modifications in the specifically described embodiments may be carried out without departing from the principles of the invention, which is intended to be limited only by the scope of the appended claims as interpreted according to the principles of patent law.

The embodiments of the invention in which an exclusive property or privilege is claimed are defined as follows:

1. A hand held indicating device for indicating a lap count to a swimmer in the water of a swimming pool, said hand held indicating device being configured to be held by a user out of the water of the swimming pool and to be at least partially immersed in the water for viewing by a swimmer in the water of the swimming pool, said indicating device comprising:

a casing having a front panel and a rear panel and a handle portion, said handle portion being configured for a user to hold said indicating device and to at least partially submerse said indicating device into the water;

a digital display at said front panel of said casing, said digital display being operable to display a lap indicating number to the swimmer;

a last lap indicator at said rear panel of said casing, said casing being movable by the user so that said last lap indicator is viewable by the swimmer; and at least one input device at said handle portion of said casing, said input device being operable at least to advance said lap indicating number of said digital display in response to an input to said input device by the user of said indicating device.

2. The hand held indicating device of claim 1, wherein said at least one input device comprises at least one button at said handle portion.

3. The hand held indicating device of claim 2, wherein said at least one button comprises a first button for advancing said lap indicating number, a second button for reducing said lap indicating number and a third button for resetting said lap indicating number.

4. The hand held indicating device of claim 1, wherein said digital display comprises at least three digits.

5. The hand held indicating device of claim 4 including a timing device, said hand held indicating device being operable to display a timing output from said timing device via said digital display.

6. The hand held indicating device of claim 5, wherein said at least one input device includes controls for operating said timing device.

7. The hand held indicating device of claim 6, wherein said at least one input device includes a control which is operable to switch said display between a lap indicating mode and a timing indicating mode.

8. The hand held indicating device of claim 5, wherein said hand held indicating device is automatically operable to switch said display between a lap indicating mode and a timing indicating mode.

9. The hand held indicating device of claim 1 including a timing device which is operable to display a timing output via a timing display at said front surface of said casing.

10. The hand held indicating device of claim 1, wherein said lap indicating number is at least approximately five inches tall so as to be highly visible in the water.

11. The hand held indicating device of claim 1, wherein said last lap indicator comprises a highly visible panel for indicating to the swimmer that the swimmer is on the last lap when said indicating device is moved by the user.

12. A hand held indicating device for indicating a lap count to a swimmer in the water of a swimming pool, said indicating device comprising:

a casing having a front panel and a rear panel and a handle portion, said handle portion being configured for a user to hold said indicating device and to at least partially submerse said indicating device into the water;

a digital display at said front panel of said casing, said digital display comprising a three digit digital display and being operable to display a lap indicating number to the swimmer;

at least one input device at said handle portion of said casing, said input device being operable at least to advance said lap indicating number of said digital display in response to an input to said input device; and a last lap indicating display at said rear panel of said casing, said last lap indicating display comprising a highly visible display panel for indicating to the swimmer that the swimmer is on the final lap when the holding position of said casing is reversed.

13. The hand held indicating device of claim 12 including a timing device, said hand held indicating device being operable to display a timing output from said timing device via said digital display.

14. The hand held indicating device of claim 13, wherein said at least one input device includes controls for operating said timing device.

15. The hand held indicating device of claim 13, wherein said at least one input device includes a control device which is operable to switch said digital display between a lap indicating mode and a timing indicating mode.

16. The hand held indicating device of claim 13, wherein said hand held indicating device is automatically operable to switch said digital display between a lap indicating mode and a timing indicating mode.

17. The hand held indicating device of claim 12 including a timing device which is operable to display a timing output via a timing display at said front surface of said casing.

18. A method for indicating a lap count to a swimmer in the water of a swimming pool, said method comprising:

providing a hand held indicating device comprising a casing having a front surface, a rear surface and a handle portion, said front surface comprising a lap count display operable to display a lap indicating number to the swimmer;

holding said handle portion by a user outside of the water at an end of the pool and at least partially submersing said lap count display in the water;

displaying said lap indicating number to the swimmer as the swimmer approaches the end of the pool; and advancing said lap indicating number via the user actuating a button on said handle portion of said hand held indicating device.

19. The method of claim 18 including displaying a last lap indicator to the swimmer by turning said casing around to display said rear surface to the swimmer, said rear surface comprising a highly visible display panel.

20. The method of claim 18 including providing a timing device in said casing, said timing device being operable to time the swimmer's progress, and displaying a timing output to the swimmer.

21. The method of claim 20, wherein displaying a timing output comprises displaying a timing output via said lap count display.

22. The method of claim 20, wherein displaying a timing output comprises displaying a timing output via a timing display on said front surface.

23. The method of claim 20 including manually switching said lap count display between a lap indicating mode and a time indicating mode.

24. The method of claim 20 including automatically switching said lap count lay between a lap indicating mode and a time indicating mode.

* * * * *

UNITED STATES PATENT AND TRADEMARK OFFICE

CERTIFICATE OF CORRECTION

PATENT NO. : 6,940,784 B1
APPLICATION NO. : 10/269,629
DATED : September 6, 2005
INVENTOR(S) : Lynn S. Benson It is certified that error appears in the above-identified patent and that said Letters Patent is hereby corrected as shown below:

<u>Column 4:</u>
Line 41, "scams" should be --seams--.

<u>Column 8:</u>
Line 65, Claim 24, "lay" should be --display--.

Signed and Sealed this

Eighth Day of January, 2008

JON W. DUDAS
*Director of the United States Patent and Trademark Office*